US012691795B2

(12) United States Patent
Jung et al.

(10) Patent No.: US 12,691,795 B2
(45) Date of Patent: Jul. 28, 2026

(54) SEAT FOR VEHICLE

(71) Applicants: HYUNDAI MOTOR COMPANY, Seoul (KR); KIA CORPORATION, Seoul (KR); DAS CO., LTD, Gyeongju-si (KR)

(72) Inventors: Chan Ho Jung, Gunpo-si (KR); Ho Suk Jung, Hwaseong-si (KR); Sang Soo Lee, Hwaseong-si (KR); Hyun Kyu Moon, Incheon (KR); Dong Hoon Keum, Busan (KR); Byung Yong Choi, Hwaseong-si (KR); Deok Soo Lim, Hwaseong-si (KR); Mu Young Kim, Osan-si (KR); Jin Ho Choi, Gyeongju-si (KR); Jae Youn Kim, Ulsan (KR)

(73) Assignees: Hyundai Motor Company, Seoul (KR); Kia Corporation, Seoul (KR); DAS CO., LTD, Gyeongju-si (KR)

( * ) Notice: Subject to any disclaimer, the term of this patent is extended or adjusted under 35 U.S.C. 154(b) by 27 days.

(21) Appl. No.: 18/663,811

(22) Filed: May 14, 2024

(65) Prior Publication Data

US 2025/0206201 A1 Jun. 26, 2025

(30) Foreign Application Priority Data

Dec. 20, 2023 (KR) ........................ 10-2023-0187292

(51) Int. Cl.
*B60N 2/12* (2006.01)
*B60N 2/02* (2006.01)
(Continued)

(52) U.S. Cl.
CPC ........... *B60N 2/12* (2013.01); *B60N 2/02246* (2023.08); *B60N 2/3011* (2013.01); *B60N 2/995* (2018.02); *B60N 2/986* (2018.02)

(58) Field of Classification Search
CPC .... B60N 2/12; B60N 2/02246; B60N 2/3011; B60N 2/995; B60N 2/986; B60N 2/02253; B60N 2/10; B60N 2/206; B60N 2/36
See application file for complete search history.

(56) References Cited

U.S. PATENT DOCUMENTS 4,986,509 A * 1/1991 Suzuki ................. B60N 2/1803
248/421
5,112,018 A * 5/1992 Wahls .................. B60N 2/1853
248/419
(Continued)

FOREIGN PATENT DOCUMENTS

KR 10-2338310 12/2021

*Primary Examiner* — J. T. Newton
(74) *Attorney, Agent, or Firm* — Fish & Richardson P.C.

(57) ABSTRACT

A seat for a vehicle includes a pair of seat rails coupled to a vehicle and spaced apart from each other in a left-right direction; a pair of left and right sliders installed to slide back and forth on each of the pairs of seat rails; a pair of left and right side frames connected so that a position thereof is changeable with respect to each of the pair of sliders; a first link unit connecting the slider and the side frame on one side thereof in a front-rear direction, and including a plurality of link members; a second link unit connecting the slider and the side frame on the other side thereof in the front-rear direction, and including a plurality of link members; and an interlocking link connecting the first link unit and the second link unit.

19 Claims, 6 Drawing Sheets

(51) Int. Cl.
  *B60N 2/30* (2006.01)
  *B60N 2/90* (2018.01)

(56) References Cited

U.S. PATENT DOCUMENTS

| | | | | |
|---|---|---|---|---|
| 5,501,422 | A * | 3/1996 | Chinomi ............. | B60N 2/02246 |
| | | | | 248/419 |
| 2003/0178877 | A1 * | 9/2003 | Schmale .............. | B60N 2/1864 |
| | | | | 297/313 |
| 2006/0061197 | A1 * | 3/2006 | Messerschmidt ........ | B60N 2/18 |
| | | | | 297/463.1 |
| 2007/0210635 | A1 * | 9/2007 | Wulf .................... | B60N 2/0705 |
| | | | | 297/316 |
| 2010/0060061 | A1 * | 3/2010 | Koga ................... | B60N 2/1615 |
| | | | | 297/344.1 |
| 2010/0253110 | A1 * | 10/2010 | Yamada ................. | B60N 2/165 |
| | | | | 296/65.05 |
| 2024/0034200 | A1 * | 2/2024 | Lee ...................... | B60N 2/1821 |
| 2025/0196730 | A1 * | 6/2025 | Jung ........................ | B60N 2/10 |
| 2025/0206201 | A1 * | 6/2025 | Jung ........................ | B60N 2/10 |

* cited by examiner

SEAT FOR VEHICLE

CROSS-REFERENCE TO RELATED APPLICATION(S)

This application claims benefit of priority to Korean Patent Application No. 10-2023-0187292, filed on Dec. 20, 2023, in the Korean Intellectual Property Office, the disclosure of which is incorporated herein by reference in its entirety.

TECHNICAL FIELD

The present disclosure relates to a seat for a vehicle configured to improve safety and convenience of passengers while implementing various functions.

BACKGROUND

A seat for a vehicle may include various seat adjustment devices, convenience devices, and safety devices installed inside and outside the seat, in addition to basic configurations such as a seat cushion for support of a lower body, a seatback against which an upper body is leaned, and a headrest supporting the head and neck.

In an example of the safety device, a bolster is provided on the left and right sides of the seat cushion and the seatback to support a side surface of a passenger when the vehicle turns or rotates rapidly. Usually, the bolster is formed in a shape in which both side surfaces of the seat cushion or seatback partially protrude.

In some examples, in vehicles with six or more seats, such as a sports utility vehicle (SUV) or a minivan, a second row seat can expand a cargo loading space through the folding of a seatback thereof, and also to secure and provide a maximum space to enter and exit the vehicle for passengers in a third row seat.

In a case in which the amount of protrusion of a seatback bolster in the second row seat increases, when the seatback is folded, the seatback may not become flat and may be inclined, for example, at an angle exceeding 7° with respect to a horizontal plane. Moreover, when the amount of protrusion of the seatback bolster increases, because a sliding walk-in function in which the second row seat moves forward may not be performed smoothly, which may make it difficult to secure the space to enter and exit a vehicle for passengers in third row seats.

SUMMARY

The present disclosure describes a seat for a vehicle that may improve the safety and convenience of passengers while integrally implementing, for example, a relaxation function, a flattening function, and a walk-in function.

According to an aspect of the present disclosure, a seat for a vehicle may include: a pair of seat rails coupled to a vehicle and spaced apart from each other in a left-right direction; a pair of left and right sliders installed to slide back and forth on each of the pairs of seat rails; a pair of left and right side frames connected so that a position thereof is changeable with respect to each of the pair of sliders; a first link unit connecting the slider and the side frame on one side thereof in a front-rear direction, and including a plurality of link members; a second link unit connecting the slider and the side frame on the other side thereof in the front-rear direction, and including a plurality of link members; and an interlocking link connecting the first link unit and the second link unit with hinges.

The slider may include: a moving rail sliding along the seat rail, and a bracket mounted on the moving rail, and wherein in the bracket, a hinge hole or a hinge portion for connecting the first link unit and the second link unit is formed.

The first link unit may include a first link member and a second link member, one end of the first link member may be rotatably hinged to the side frame, the other end of the first link member may be hinged to one end of the second link member so as to be rotatable with respect to each other, and the other end of the second link member may be rotatably hinged to the slider.

The second link unit may include a third link member and a fourth link member, one end of the third link member may be rotatably hinged to the side frame, the other end of the third link member may be hinged to one end of the fourth link member so as to be rotatable with respect to each other, and the other end of the fourth link member may be rotatably hinged to the slider.

One end of the interlocking link may be rotatably hinged to the second link member, and the other end of the interlocking link may be rotatably hinged to the fourth link member.

The pair of side frames may be connected to each other by at least one cross bar, the first link unit may include a first link member and a second link member, and the second link unit may include a third link member and a fourth link member.

The first link unit may further include a first driver providing rotational force to the first link unit.

The first driver may be mounted on any one of the pair of side frames and may be connected to the first link member.

The first driver may include: a first driving motor; a first gearbox connected to a motor shaft of the first driving motor; and an external spline formed on an output shaft of the first gearbox, wherein the external spline may engage with an internal spline formed in one end of the first link member.

The seat for a vehicle may execute a fold-and-dive mode or a relaxation mode by the first driving motor.

In the fold-and-dive mode, the first link member may rotate in a first direction around the output shaft in the side frame by rotational force applied from the first driving motor, and may simultaneously move the side frame backward while lowering a front portion of the side frame, and according to the movement of the side frame, the third link member may rotate in the second direction around a hinge point of the side frame, and may simultaneously lower a rear portion of the side frame.

In the relaxation mode, the first link member may rotate in a second direction around the output shaft in the side frame by rotational force applied from the first driving motor, and may simultaneously move the side frame backward while raising a front portion of the side frame, and according to the movement of the side frame, the third link member may rotate in the second direction around a hinge point of the side frame, and may simultaneously lower a rear portion of the side frame.

In the fold-and-dive mode or the relaxation mode, the fourth link member may restrain the second link member through the interlocking link.

The second link unit may further include a second driver providing rotational force to the second link unit.

The second driver may be mounted on the fourth link member and may rotate together therewith, according to rotation of the fourth link member.

The second driver may include: a second driving motor; a second gearbox connected to a motor shaft of the second driving motor; a connection shaft connected to the second gearbox; and a pair of cores coupled to both ends of the connection shaft, respectively, wherein the connection shaft may be fixedly connected to one end of the fourth link member through the core.

The seat for a vehicle may execute a tilt-up-and-walk-in mode by the second driving motor.

In the tilt-up-and-walk-in mode, the fourth link member may rotate in a first direction around the connection shaft in the slider by rotational force applied from the second driving motor, and may simultaneously move the side frame forward while raising a rear portion of the side frame, and according to the movement of the side frame, the second link member may rotate in the first direction around a hinge point of the slider, and may simultaneously lower a front portion of the side frame.

In the tilt-up-and-walk-in mode, the interlocking link may interlock the fourth link member and the second link member so that the second link member rotates in the first direction.

According to another aspect of the present disclosure, a seat for a vehicle may include: a pair of seat rails coupled to a vehicle and spaced apart from each other in a left-right direction; a pair of left and right sliders installed to slide back and forth on each of the pairs of seat rails; a pair of left and right side frames connected so that a position thereof is changeable with respect to each of the pair of sliders; a first link unit connecting the slider and the side frame on one side thereof in a front-rear direction, and including a first link member and a second link member; a second link unit connecting the slider and the side frame on the other side thereof in the front-rear direction, and including a third link member and a fourth link member; and an interlocking link connecting the second link member and the fourth link member, wherein the slider, the second link member, the first link member, the side frame, the third link member, the fourth link member, and the interlocking link may be hinged to each other to form a seven-bar linkage mechanism.

BRIEF DESCRIPTION OF DRAWINGS

The above and other aspects, features, and advantages of the present disclosure will be more clearly understood from the following detailed description, taken in conjunction with the accompanying drawings.

DETAILED DESCRIPTION

Figure 1:
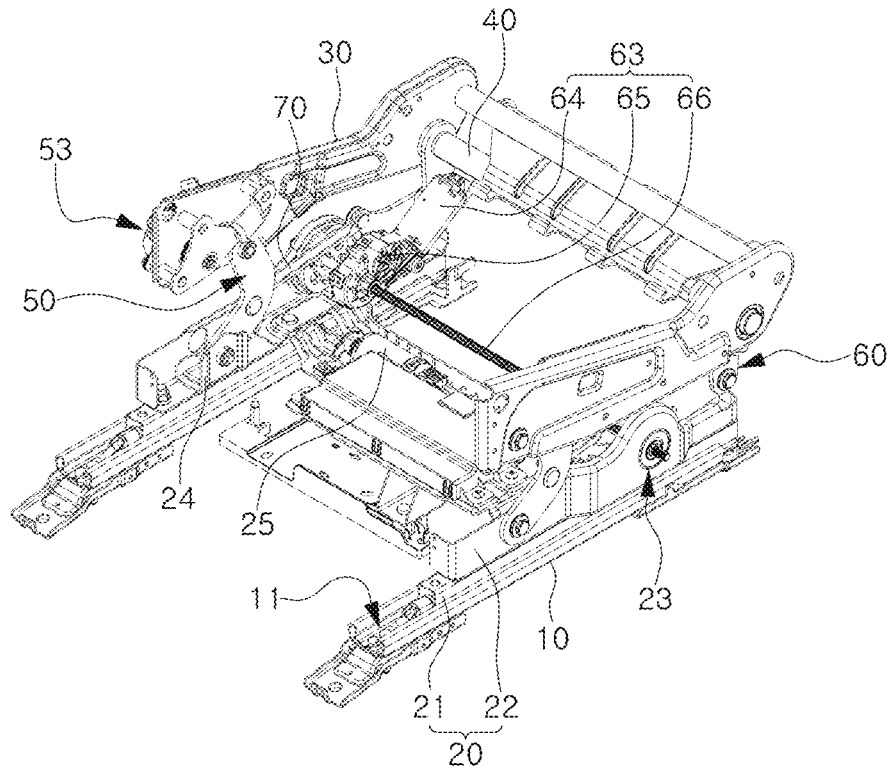
FIG. 1 is a partial perspective view illustrating an example of a seat for a vehicle.

Hereinafter, the present disclosure will be described in detail with reference to the accompanying drawings. In adding reference numerals to elements of each of the drawings, although the same elements are illustrated in other drawings, like reference numerals may refer to like elements.

Figure 2:
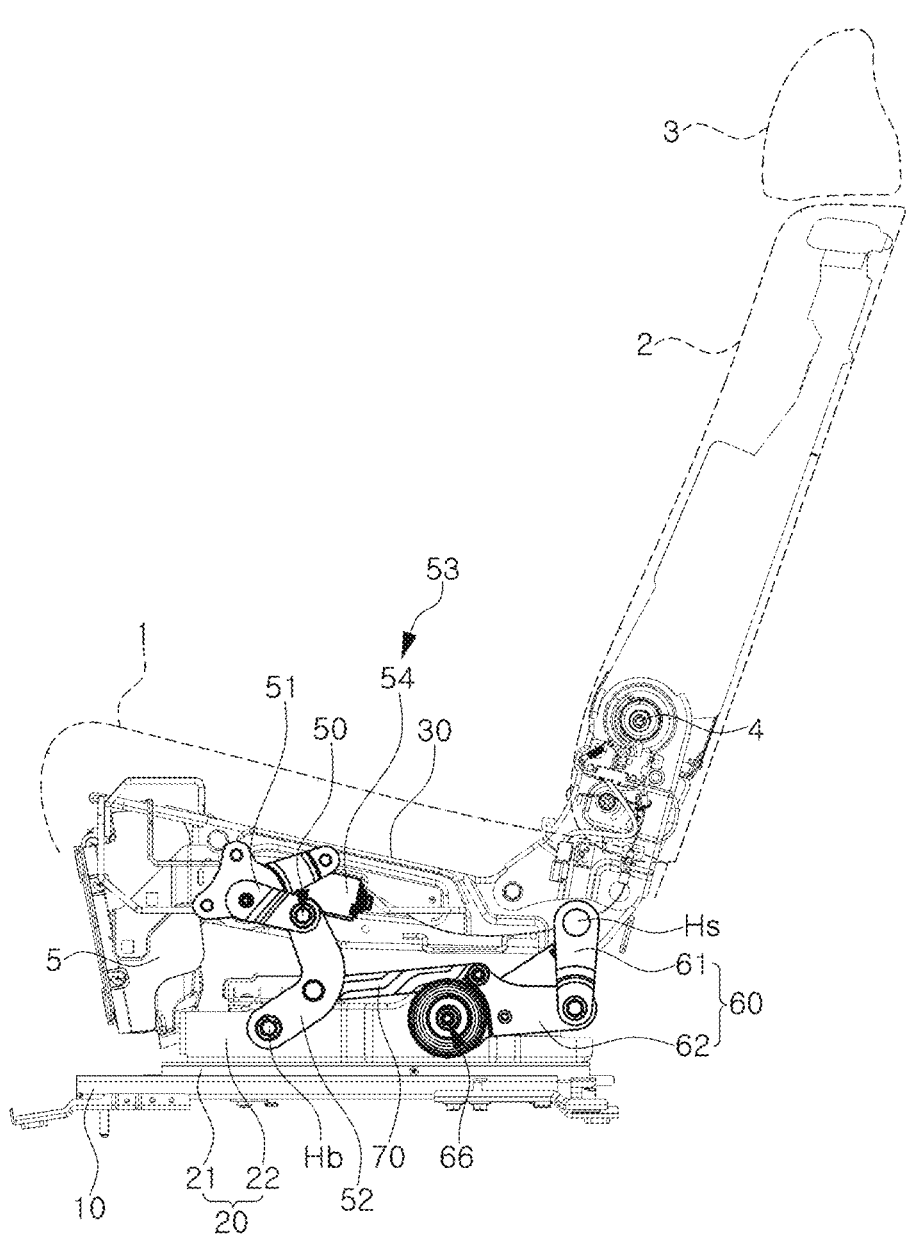
FIG. 2 is a side view of FIG. 1, which illustrates an example of a reference posture of an operation.

FIG. 1 is a partial perspective view illustrating a seat for a vehicle, and FIG. 2 is a side view of FIG. 1, which illustrates a reference posture of an operation. Furthermore, FIG. 3 is an exploded perspective view of a main portion of FIG. 1.

In some implementations, a seat for a vehicle may include a seat cushion 1 for seating a lower body, a seatback 2 for leaning an upper body, and a headrest 3 for supporting a head and a neck. However, for convenience of illustration and explanation, more detailed drawings and detailed explanations thereof will be omitted.

Figure 3:
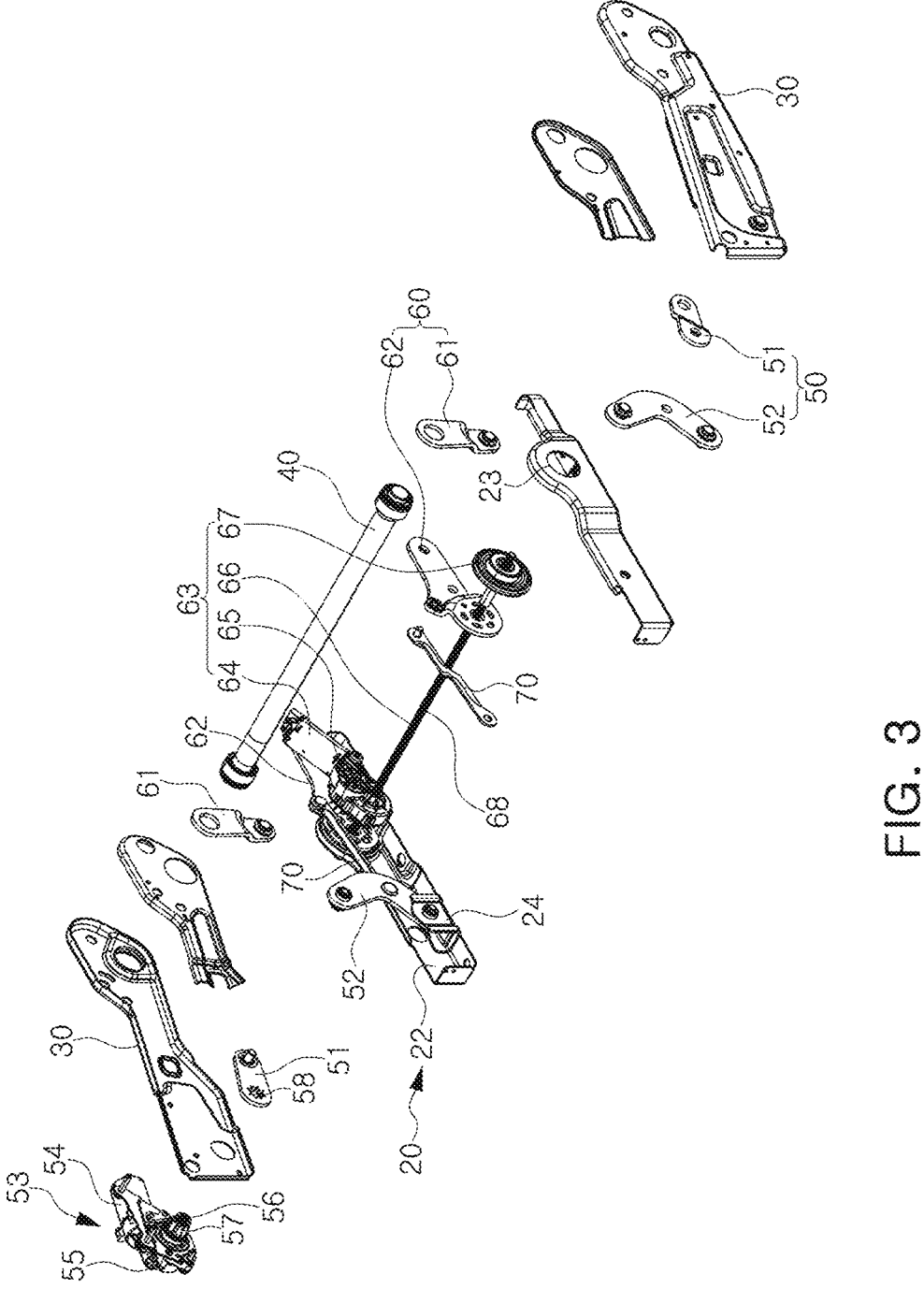
FIG. 3 is an exploded perspective view of a main portion of FIG. 1.

As illustrated in FIG. 1 to FIG. 3, a seat for a vehicle may include a pair of seat rails 10, a pair of sliders 20, a pair of side frames 30, a first link unit 50, a second link unit 60, and an interlocking link 70.

The pair of seat rails 10 may be spaced apart from each other in a left-right direction and disposed side by side on a floor panel in an interior of the vehicle. Specifically, an open passage 11 which is elongated back and forth for a sliding movement of the slider 20 may be formed in an upper portion of each seat rail. The open passage may constitute a path for a sliding movement of the slider.

The pair of sliders 20 may be installed so as to slide back and forth in a longitudinal direction of the seat rail in each seat rail 10 to support a bottom portion of the seat. Each slider may include a moving rail 21 sliding along the open passage 11 of the seat rail, and a bracket 22 mounted on the moving rail.

The moving rail 21 may be comprised of a manual manner performed by an operation of a towel bar, and an electric manner performed by receiving power from a motor according to an operation of a switch. Since the configuration and operation relationship of the moving rail are already known, a detailed description thereof will be omitted in the present specification.

The bracket 22 may have a hinge hole 23 or a hinge portion formed to connect the first link unit 50 and the second link unit 60, and may be further provided with an auxiliary bracket 24 or the like.

Each of the pair of side frames 30 may be disposed on the corresponding slider 20 and placed side by side with each other, and may support a cushion panel configured to support a load of a passenger below the cushion panel. The pair of side frames may be connected to each other by at least one cross bar 40.

The cross bar 40 is a member connecting and supporting a pair of left and right side frames 30 in the left-right direction, and at least one thereof may be interposed between front and rear sides of the seat. The cross bar may be formed of a tubular member having a circular cross section, but the configuration is not limited thereto.

The first link unit 50, the second link unit 60, and the interlocking link 70 may be disposed on left and right sides of the seat, respectively. In other words, the first link unit, the second link unit, and the interlocking link may be provided in pairs. The first link unit, the second link unit, and the interlocking link may be disposed between the slider 20 and the side frame 30 on one side of left and right sides of the seat, and the first link unit, the second link unit, and the interlocking link may be disposed between the slider and the side frame on the other side of left and right sides of the seat.

The first link unit 50 may connect the slider 20 and the side frame 30 on one side of the seat in a front-rear direction, for example, in front of the seat. To this end, the first link unit may include a first link member 51 and a second link member 52.

One end of the first link member 51 may be rotatably hinged to the side frame 30, and the other end of the first link member may be hinged to one end of the second link member 52 so as to be rotatable with respect to each other. Furthermore, the other end of the second link member may be rotatably hinged to the bracket 22 of the slider 20.

The second link unit 60 may connect the slider 20 and the side frame 30 in one side of the seat in the front-rear direction, for example, at the rear of the seat. To this end, the second link unit may include a third link member 61 and a fourth link member 62.

One end of the third link member 61 may be rotatably hinged to the side frame 30 and the cross bar 40, and the other end of the third link member may be hinged to one end of the fourth link member 62 so as to be rotatable with respect to each other. Furthermore, the other end of the fourth link member may be rotatably hinged to the bracket 22 of the slider 20.

As described above, in the drawings, an example in which the first link unit 50 is disposed on a front side of the seat, while the second link unit 60 is disposed on a rear side of the seat is illustrated. However, the combination or arrangement relationship of the link units is not limited thereto, and may be performed in reverse.

In the first link unit 50, a first driver 53 may be installed to provide rotational force to the first link unit to adjust an inclination angle and/or a height of the side frame 30 with respect to the seat rail 10 or the slider 20. As illustrated in FIGS. 1 and 3, the first driver may be mounted on an outer surface of a side frame of any one of a pair of side frames by, for example, bolting.

The first driver 53 is mounted on only one side frame of the pair of side frames 30, but a pair of left and right side frames are connected to each other by at least one cross bar 40, and accordingly, when an inclination angle and/or a height of one side frame is adjusted, an inclination angle and/or a height of the other side frame may be synchronously adjusted equally.

The first driver 53 may include a first driving motor 54, a first gearbox 55 connected to a motor shaft of the first driving motor, and an external spline 57 formed on an output shaft 56 of the first gearbox.

The first gearbox 55 may include, for example, a worm shaft installed on the motor shaft of the first driving motor 54, a worm wheel engaging with an outer circumferential surface of the worm shaft, and an output shaft 56 connected to the worm wheel. However, the configuration of the first gearbox is not limited thereto.

The output shaft 56 may penetrate through the side frame 30 and may be connected to one end of the first link member 51, thereby acting as a hinge shaft. Furthermore, the external spline 57 formed on an outer circumferential surface of the output shaft may engage with an internal spline 58 formed in one end of the first link member 51.

Accordingly, the rotational force of the first driving motor 54 may be transmitted to the first link member 51 through the first gearbox 55 and the output shaft 56, so that the first link member may rotate relatively with respect to the side frame 30. At the same time, due to the rotation of the first link member, the second link member 52 that is rotatably hinged to the slider 20 may rotate relatively with respect to the first link member.

The first driver 53 may allow the seat for a vehicle to execute a fold-and-dive mode and a relaxation mode.

In the second link unit 60, a second driver 63 may be installed to provide rotational force to the second link unit to adjust an inclination angle and/or a height of the side frame 30 with respect to the seat rail 10 or the slider 20. As illustrated in FIGS. 1 and 3, the second driver may be mounted on a fourth link member 62 of a second link unit on one side, among a pair of second link units respectively disposed on both left and right sides of the seat, for example, by bolting. Accordingly, the second driver may rotate together therewith, according to the rotation of the corresponding fourth link member.

The second driver 63 may include a second driving motor 64, a second gearbox 65 connected to a motor shaft of the second driving motor, a connection shaft 66 connected to an output side of the second gearbox, and a pair of cores 67 respectively coupled to both ends of the connection shaft.

The second gearbox 65 may include, for example, a worm screw installed on a motor shaft of the second driving motor 64, a worm wheel engaging with an outer circumferential surface of the worm screw, and an output gear interlocking with the worm wheel, and the connection shaft 66 may be connected to the output gear. However, the configuration of the second gear box is not limited thereto.

The connection shaft 66 may be fixedly connected to one end of the fourth link member 62 through the core 67, and thus may act as a hinge shaft. Furthermore, an external spline 68 may be formed on an outer circumferential surface of the connection shaft to engage with the internal spline formed in the output gear in the second gearbox, so that the connection shaft may transmit rotational force of the second driving motor 64 to the fourth link member.

The pair of cores 67 may be formed in a plate shape having an approximately predetermined thickness, and may be fixedly coupled to both ends of the connection shaft 66 so as not to rotate relatively with respect to each other. The fourth link member 62 may be fixedly coupled to one side of the core, for example a side surface facing the inside of the seat, and a step portion formed on the other side of the core, for example a side surface facing the outside of the seat, may be rotatably connected to the hinge hole 23 formed in the bracket 22 of the slider 20.

The core 67 may be applied to be fixed to the hinge portion of the fourth link member 62 in the second link unit 60, and thus may act as a restraining means for securing the strength of the second link unit 60 and preventing the second link unit 60 from moving in the front-rear direction when the second link unit 60 is fixed without rotating.

Accordingly, as the rotational force of the second driving motor 64 is transmitted to the fourth link member 62 through the second gearbox 65 and the connection shaft 66, the fourth link member may rotate relatively with respect to the slider 20. At the same time, due to the rotation of the fourth link member, the third link member 61 rotatably hinged to the side frame 30 rotates relatively with respect to the fourth link member. Furthermore, the second driver 63 mounted on the fourth link member of the second link unit 60 in one side may rotate together therewith, according to the rotation of the corresponding fourth link member.

The second driver 63 may allow the seat for a vehicle to execute a tilt-up-and-walk-in mode.

The interlocking link 70 may connect the first link unit 50 and the second link unit 60. One end of the interlocking link may be hinged to an intermediate portion of the second link member 52 constituting the first link unit so as to be rotatable with respect to each other. The other end of the interlocking link may be hinged to an intermediate portion of the fourth link member 62 constituting the second link unit so as to be rotatable with respect to each other.

Accordingly, the interlocking link 70 may connect the second link member 52 of the first link unit 50 and the fourth link member 62 of the second link unit 60 and may bind the second link member 52 and the fourth link member 62 to each other, so that operations of the first link unit and the second link unit may be interlocked or regulated with each other.

In a seat for a vehicle, among the components, the slider 20, the second link member 52 and the first link member 51 of the first link unit 50, the side frame 30, the third link member 61 and the fourth link member 62 of the second link unit 60, and the interlocking link 70 are hinged to each other, thereby forming a seven-bar linkage mechanism.

Meanwhile, a recliner 4 may be interposed between the seat cushion 1 and the seatback 2 of the seat for a vehicle, so that an inclination angle of the seatback with respect to the seat cushion may be appropriately adjusted by the recliner. Using a motor in the recliner, the seat for a vehicle may be a so-called power seat.

The recliners may have various configurations, and detailed descriptions thereof will be omitted herein.

Furthermore, in a seat for a vehicle, a legrest 5 may be selectively disposed in front of the seat cushion 1. The legrest may have a predetermined support surface capable of supporting a leg (calf) of a passenger.

The legrest 5 may be configured to adjust an angle thereof regardless of the seat cushion 1 or the seatback 2. That is, the legrest may be independently unfolded or folded using a separate power source, regardless of an adjustment of an inclination angle and a height of the seat cushion. An operation of the legrest only needs not to interfere with or disturb an operation of the seat cushion.

The legrests may have various configurations, and a detailed description thereof will be omitted in the present specification.

A seat for a vehicle may further include a switch for inputting a request of the passenger, and a controller for controlling operations of the driving motors 54 and 64 and/or other motors according to a switch operation.

The controller may control an operation of the first driving motor 54 constituting the first driver 53 of the first link unit 50 based on the passenger's switch operation, and an operation of the second driving motor 64 constituting the second driver 63 of the second link unit 60. Here, as the first and second driving motors, for example, a servo motor or a step motor capable of forward or reverse rotation may be adopted.

Hereinafter, an operation of a seat for a vehicle, having the above-described configuration, will be described.

First, a seat for a vehicle may basically implement a forward and backward mode.

For example, when an electric type moving rail 21 is adopted, as illustrated in FIG. 2, in a state in which the seat for a vehicle maintains a reference posture, the motor 25 (see FIG. 1) may be driven in response to the passenger's request, i.e. an switch operation, and driving force of the motor may be transmitted to the moving rail via any power transmission mechanism, so that the moving rail may move relatively with respect to the seat rail in the longitudinal direction of the seat rail 10.

In this case, as the side frame 30 connected to the moving rail 21 moves together, the seat cushion 1 and an entire seat may be moved forward or backward to adjust front and rear positions of the seat.

Figure 4:
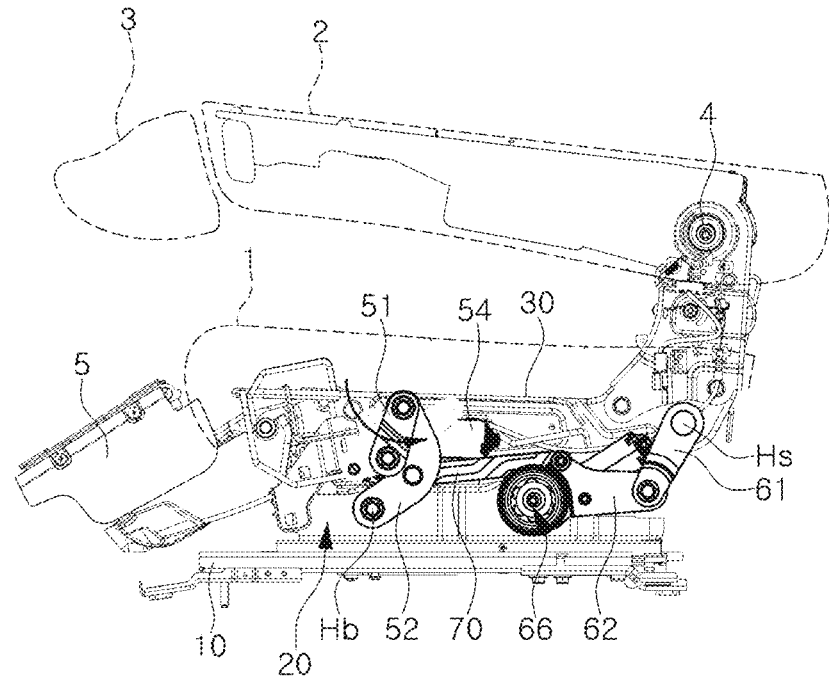
FIG. 4 is a view illustrating an example of a fold-and-dive mode of the seat for a vehicle.

FIG. 4 is a view illustrating a fold-and-dive mode of a seat for a vehicle.

In a seat for a vehicle, when the seatback 2 is folded, the seatback may be flattened and the seat cushion 1 may be lowered.

For example, when the first link unit 50 is disposed on a front side of the seat and the recliner 4 is interposed between the seat cushion 1 and the seatback 2, the controller may control the operation of the first driving motor 54 constituting the first driver 53, together with the motor of the recliner, in response to the passenger's request, i.e., the switch operation.

From the reference posture of the seat for a vehicle illustrated in FIG. 2, simultaneously with folding the seatback 2 according to an operation of the recliner 4, the first driving motor 54 connected to the first link member 51 of the first link unit 50 is driven, and the motor shaft of the first driving motor rotates in one direction.

Accordingly, the rotational force of the first driving motor 54 is transmitted to the first link member 51 through the first gearbox 55 and the output shaft 56, and then, the first link member rotates in the first direction (counterclockwise in FIG. 4) around an output shaft in the side frame 30, and simultaneously lowers a front portion of the side frame downwardly.

Due to the rotation of the first link member 51, side frames 30 on both sides are moved backward. According to the movement of the side frame, the third link member 61 rotates in the second direction (clockwise from FIG. 4) around a hinge point Hs of the side frame, and simultaneously lowers a rear portion of the side frame somewhat downwardly.

In this case, the second driver 63 does not operate. In other words, the second driving motor 64 is not driven in the fold-and-dive mode. Furthermore, the fourth link member 62 restrains the second link member 52 through the interlocking link 70 hinged to the intermediate portion of the fourth link member to regulate the operation of the second link member.

Optionally, when the legrest 5 is disposed in front of the seat cushion 1, the controller may control a separate power source so that the legrest may be independently unfolded.

In this way, in a seat for a vehicle, the inclination angle of the side frame 30 may be changed and the front and rear portions of the side frame may be lowered simultaneously through the fold-and-dive mode by the seven-bar linkage mechanism, so that the seatback 2 may be substantially parallel to the horizontal plane, and heights of the seat cushion 1 and the entire seat may be lowered.

Therefore, when the seat for a vehicle is applied to a second row seat in a vehicle with six or more seats, even if the amount of protrusion of a seatback bolster is increased, there may be an advantage in that the seatback may be almost flat when the seatback 2 is folded in the fold-and-dive mode, and a step portion from a third row seat may be eliminated.

In the fold-and-dive mode of the seat for a vehicle, the seatback 2 may be inclined, for example, at an angle of 6.5 degrees with respect to the horizontal plane, and may be folded, substantially parallel to the horizontal plane.

By expanding a cargo loading space of a vehicle through flattening of the seatback in this manner, the seat for a vehicle has an effect of improving loading performance of the vehicle.

Figure 5:
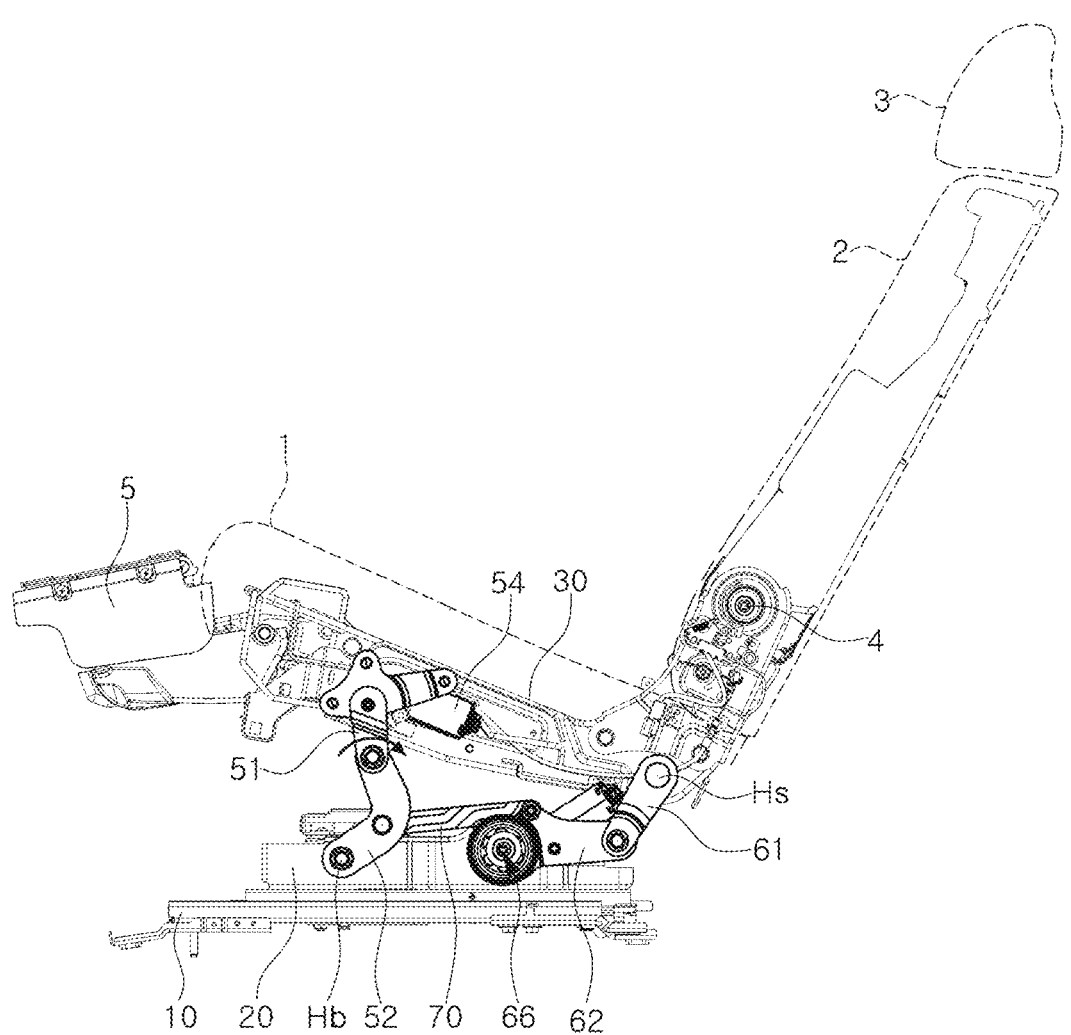
FIG. 5 is a diagram illustrating an example of a relaxation mode of the seat for a vehicle.

FIG. 5 is a diagram illustrating a relaxation mode of a seat for a vehicle.

In a seat for a vehicle, the seat cushion 1 may be tilted so that a rear portion thereof is relatively low.

For example, when the first link unit 50 is disposed on the front side of the seat, the controller may control the operation of the first driving motor 54 constituting the first driver 53, in response to the passenger's request, i.e., the switch operation.

The first driving motor 54 connected to the first link member 51 of the first link unit 50 is driven, and the motor shaft of the first driving motor rotates in an opposite direction.

Accordingly, the rotational force of the first driving motor 54 is transmitted to the first link member 51 through the first gearbox 55 and the output shaft 56, and then, the first link member rotates in the second direction (clockwise from FIG. 5) about the output shaft in the side frame 30, and simultaneously raises the front portion of the side frame upwardly.

Due to the rotation of the first link member 51, side frames 30 on both sides are moved backward. According to the movement of the side frame, the third link member 61 rotates in the second direction (clockwise in FIG. 5) around the hinge point Hs of the side frame, and simultaneously lowers the rear portion of the side frame somewhat downwardly. The third link member may rotate so that a rear end of the seat cushion 1 reaches a lowermost position.

In this case, the second driver 63 does not operate. In other words, the second driving motor 64 is not driven in the relaxation mode. Furthermore, the fourth link member 62 restrains the second link member 52 through the interlocking link 70 hinged to the intermediate portion of the fourth link member to regulate the operation of the second link member.

Optionally, when the legrest 5 is disposed in front of the seat cushion 1, the controller may control a separate power source so that the legrest may be independently unfolded.

In this manner, the seat for a vehicle may allow the rear portion of the side frame to descend further, in addition to a change in the inclination angle of the side frame 30 through the relaxation mode by the seven-bar linkage mechanism, thereby supporting the lower body of the passenger by a tilted seat cushion 1.

Accordingly, in the seat for a vehicle, the rear portion of the seat cushion 1 is disposed to be relatively lower than the front portion thereof, which may will allow passengers to take an easy and comfortable posture.

Through the tilting of the seat cushion 1, the seat for a vehicle has an effect of improving the convenience of the passenger.

Figure 6:
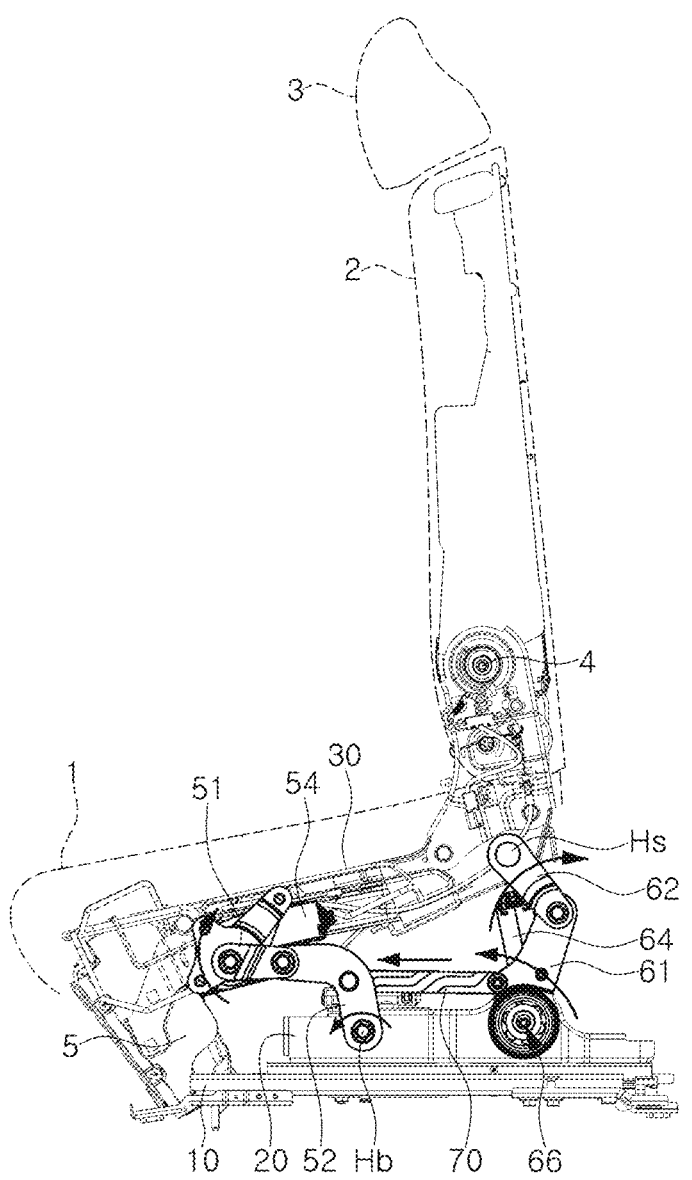
FIG. 6 is a view for explaining an example of a tilt-up-and-walk-in mode of the seat for a vehicle.

FIG. 6 is a view for explaining a tilt-up-and-walk-in mode of a seat for a vehicle.

In a seat for a vehicle, the seat cushion 1 may move forward so that a front portion thereof is tilted relatively low.

For example, when the second link unit 60 is disposed on the rear side of the seat, the controller may control the operation of the second driving motor 64 constituting the second driver 63, in response to the passenger's request, i.e., the switch operation.

The second driving motor 64 connected to the fourth link member 62 of the second link unit 60 is driven through the connection shaft 66, and the motor shaft of the second driving motor rotates in one direction.

Accordingly, the rotational force of the second driving motor 64 is transmitted to the fourth link member 62 through the second gearbox 65 and the connection shaft 66, and then, the fourth link member rotates in the first direction (counterclockwise in FIG. 6) around the connection shaft in the bracket 22 of the slider 20, and simultaneously raises the rear portion of the side frame 30 upwardly.

Due to rotation of the fourth link member 62, side frames 30 on both sides are moved forward. According to movement of the side frame, the second link member 52 rotates in the first direction around the hinge point Hb of the bracket 22, and simultaneously lowers the front portion of the side frame downwardly.

In this case, the first driver 53 does not operate. In other words, the first driving motor 54 is not driven in the tilt-up-and-walk-in mode. Furthermore, the interlocking link 70 hinged to the intermediate portion of the fourth link member 62 interlocks the fourth link member and the second link member so that the second link member 52 rotates in the first direction.

In this manner, in the seat for a vehicle, the inclination angle of the side frame 30 may be changed and the rear portion of the side frame may be raised higher than the front portion thereof through the tilt-up-and-walk-in mode by the seven-bar linkage mechanism, so that the seatback 2 may be tilted more forward than a vertical surface, and the seat cushion 1 and the entire seat may be moved forward.

Accordingly, when the seat for a vehicle is applied to the second row seat in a vehicle with six or more seats, even if the amount of protrusion of the seatback bolster is increased, there may be an advantage in that the walk-in function of moving the second row seat forward may be smoothly performed.

By securing a space for passengers in the three row seat to enter and exit the vehicle through the tilt-up-and-walk-in mode of such a seat, the seat for a vehicle has the effect of improving the safety of passengers and providing convenience when the passengers get on or off the vehicle.

As described above, due to the configuration to which the seven-bar linkage mechanism is applied, it may be possible to improve the safety and convenience of passengers while integrally implementing, for example, a relaxation function, a flattening function, and a walk-in function.

The aforementioned description merely illustrates the technical concept of the present disclosure, and a person skilled in the art to which the present disclosure pertains may make various modifications and modifications without departing from the essential characteristics of the present disclosure.

Therefore, the example implementations disclosed in this specification and drawings are not intended to limit but to explain the technical idea of the present disclosure, and the scope of the technical idea of the present disclosure is not limited by these example implementations. The scope of protection of the present disclosure should be interpreted by the appended claims, and all technical concepts within the scope equivalent thereto should be interpreted as being included in the right scope of the present disclosure.

What is claimed is:

1. A seat for a vehicle, comprising:
a pair of seat rails coupled to the vehicle and spaced apart from each other in a left-right direction;
a left slider and a right slider that are disposed on the pair of seat rails, respectively, and that are configured to move back and forth along the pair of seat rails;
a left side frame and a right side frame that are connected to each other, wherein positions of the left and right side frames are configured to change with respect to the left and right sliders, respectively;
a first link unit comprising a plurality of first links that connect one of the left slider or the right slider to one of the left side frame or the right side frame, respectively, the first link unit being disposed at one of a front side or a rear side of the seat in a front-rear direction;

a second link unit comprising a plurality of second links that connect the other of the left slider or the right slider to the other of the left side frame or the right side frame, respectively, the second link unit being disposed at the other of the front side or the rear side of the seat in the front-rear direction; and an interlocking link that connects the first link unit to the second link unit, wherein the plurality of first links comprise a first link and a second link, wherein the first link has:

a first end rotatably coupled to the one of the left side frame or the right side frame, and a second end rotatably coupled to a first end of the second link, the first link being configured to rotate with respect to the second link, and wherein a second end of the second link is rotatably coupled to one of the left and right sliders.

2. The seat according to claim 1, wherein each of the left slider and the right slider comprises:

a moving rail configured to move along one of the pair of seat rails, and a bracket disposed at the moving rail, the bracket comprising a hinge portion that connects the first link unit to the second link unit.

3. A seat for a vehicle, comprising:

a pair of seat rails coupled to the vehicle and spaced apart from each other in a left-right direction;

a left slider and a right slider that are disposed on the pair of seat rails, respectively, and that are configured to move back and forth along the pair of seat rails;

a left side frame and a right side frame that are connected to each other, wherein positions of the left and right side frames are configured to change with respect to the left and right sliders, respectively;

a first link unit comprising a plurality of first links that connect one of the left slider or the right slider to one of the left side frame or the right side frame, respectively, the first link unit being disposed at one of a front side or a rear side of the seat in a front-rear direction;

a second link unit comprising a plurality of second links that connect the other of the left slider or the right slider to the other of the left side frame or the right side frame, respectively, the second link unit being disposed at the other of the front side or the rear side of the seat in the front-rear direction;

an interlocking link that connects the first link unit to the second link unit; and at least one cross bar that connects the left and right side frames to each other, wherein the plurality of first links comprise a first link and a second link, and wherein the plurality of second links comprise a third link and a fourth link.

4. The seat according to claim 3, wherein the first link unit further comprises a first driver configured to supply rotational force to the first link unit.

5. The seat according to claim 4, wherein the first driver is disposed at any one of the left and right side frames and connected to the first link.

6. The seat according to claim 4, wherein the first driver comprises:

a first driving motor; and a first gearbox connected to a motor shaft of the first driving motor, the first gearbox comprising an output shaft that define an external spline, and wherein the first link defines an internal spline at an end of the first link, the internal spline engaging with the external spline.

7. The seat according to claim 6, wherein the first driving motor is configured to operate the seat in a fold-and-dive mode and a relaxation mode.

8. The seat according to claim 7, wherein the first link is configured to, in the fold-and-dive mode, (i) rotate in a first direction around the output shaft by the rotational force from the first driving motor and (ii) move the one of the left side frame or the right side frame backward while lowering a front portion of the one of the left side frame or the right side frame, and wherein the third link is configured to, based on a movement of the one of the left side frame or the right side frame in the fold-and-dive mode, (i) rotate in a second direction around a hinge point of the one of the left side frame or the right side frame and (ii) lower a rear portion of the one of the left side frame or the right side frame.

9. The seat according to claim 8, wherein the first link is configured to, in the relaxation mode, (i) rotate in the second direction around the output shaft in by the rotational force from the first driving motor and (ii) move the one of the left side frame or the right side frame backward while raising the front portion of the one of the left side frame or the right side frame, and wherein the third link is configured to, based on a movement of the one of the left side frame or the right side frame in the relaxation mode, (i) rotate in the second direction around the hinge point of the one of the left side frame or the right side frame and (ii) lower the rear portion of the one of the left side frame or the right side frame.

10. The seat according to claim 7, wherein the fourth link is configured to, in the fold-and-dive mode or the relaxation mode, restrain the second link through the interlocking link.

11. The seat according to claim 3, wherein the second link unit further comprises a second driver configured to supply rotational force to the second link unit.

12. The seat according to claim 11, wherein the second driver is disposed at the fourth link and configured to rotate together with the fourth link based on rotation of the fourth link.

13. The seat according to claim 11, wherein the second driver comprises:

a second driving motor;

a second gearbox connected to a motor shaft of the second driving motor;

a connection shaft connected to the second gearbox; and a pair of cores coupled to ends of the connection shaft, respectively, and wherein the connection shaft is fixed to one end of the fourth link through one of the pair of cores.

14. The seat according to claim 13, wherein the second driving motor is configured to operate the seat in a tilt-up-and-walk-in mode.

15. The seat according to claim 14, wherein the fourth link is configured to, in the tilt-up-and-walk-in mode, (i) rotate in a first direction around the connection shaft by the rotational force from the second driving motor and (ii) move the other of the left side frame or the right side frame forward while raising a rear portion of the other of the left side frame or the right side frame, and wherein the second link is configured to, based on a movement of the other of the left side frame or the right side frame in the tilt-up-and-walk-in mode, (i) rotate in the first direction around a hinge point of the other of the left slider or the right slider and (ii) lower a front portion of the other of the left side frame or the right side frame.

16. The seat according to claim 15, wherein the interlocking link is configured to, in the tilt-up-and-walk-in mode, interlock the fourth link and the second link to thereby allow the second link to rotate in the first direction.

17. The seat according to claim 1, wherein the plurality of second links comprise a third link and a fourth link, wherein the third link has:
   a first end rotatably coupled to the other of the left side frame or the right side frame,
   a second end rotatably coupled to a first end of the fourth link, the third link being configured to rotate with respect to the fourth link, and
   wherein a second end of the fourth link is rotatably coupled to the other of the left and right sliders.

18. The seat according to claim 17, wherein the interlocking link has (i) a first end rotatably coupled to the second link and (ii) a second end rotatably coupled to the fourth link.

19. A seat for a vehicle, comprising:
   a pair of seat rails coupled to the vehicle and spaced apart from each other in a left-right direction;

a left slider and a right slider configured to move back and forth along the pair of seat rails, respectively;

a left side frame and a right side frame that are connected to each other, wherein positions of the left and right side frames are configured to change with respect to the left and right sliders, respectively;

a first link unit comprising a first link and a second link that connect one of the left slider or the right slider to one of the left side frame or the right side frame, respectively, the first link unit being disposed at one of a front side or a rear side of the seat in a front-rear direction;

a second link unit comprising a third link and a fourth link that connect the other of the left slider or the right slider to the other of the left side frame or the right side frame, the second link unit being disposed at the other of the front side or the rear side of the seat in the front-rear direction; and an interlocking link that connects the second link and the fourth link to each other, wherein one of the left slider or the right slider, the second link, the first link, one of the left side frame or the right side frame, the third link, the fourth link, and the interlocking link are hinged to one another and define a seven-bar linkage mechanism.

* * * * *